United States Patent [19]
Borys et al.

[11] Patent Number: 5,536,540
[45] Date of Patent: Jul. 16, 1996

[54] AUTOMOTIVE TRIM PIECE

[75] Inventors: Tadeusz Borys, Aurora; Earlby E. J. Wakefield, Guelph, both of Canada

[73] Assignee: Decoma International Inc., Canada

[21] Appl. No.: 141,710

[22] Filed: Oct. 27, 1993

Related U.S. Application Data

[63] Continuation of Ser. No. 731,669, Jul. 17, 1991, abandoned.

[51] Int. Cl.[6] .......................... B60R 13/00; B60R 19/00
[52] U.S. Cl. .......................... 428/31; 293/128; 428/40.6; 428/99; 428/101; 428/121; 428/131; 428/188; 428/192; 428/343; 428/423.1; 428/424.6; 428/425.8; 428/457; 428/461; 428/463; 428/689
[58] Field of Search .................. 428/31, 40, 99, 428/131, 101, 343, 354, 461, 463, 423.1, 457, 425.8, 192, 424.6, 689, 121, 188; 293/128.1

[56] References Cited

U.S. PATENT DOCUMENTS

| | | | |
|---|---|---|---|
| 1,476,509 | 12/1923 | Hart | 296/135 |
| 2,910,033 | 10/1959 | Weisburg | 114/219 |
| 3,122,804 | 3/1964 | Stawinski | 24/73 |
| 3,147,176 | 9/1964 | Haslam | 428/55 |
| 3,188,730 | 6/1965 | Meyer | 29/430 |
| 3,359,030 | 12/1967 | Newman | 293/1 |
| 3,388,523 | 6/1968 | Evans | 52/717 |
| 3,506,294 | 4/1970 | Newman | 293/1 |
| 3,517,473 | 6/1970 | Kistner et al. | 52/718 |
| 3,565,478 | 2/1971 | George | 293/1 |
| 3,606,431 | 9/1971 | Kunevicius | 293/1 |
| 3,606,432 | 9/1971 | Honatzis | 293/1 |
| 3,606,433 | 9/1971 | Kunevicius | 293/1 |
| 3,681,877 | 8/1972 | Loew | 52/718 |
| 3,687,502 | 8/1972 | Loew | 293/1 |
| 3,752,521 | 8/1973 | Lafebre | 293/1 |
| 3,770,545 | 11/1973 | Jackson | 293/1 |
| 3,777,438 | 12/1973 | Brown | 293/1 |
| 3,817,016 | 6/1974 | Barenyi | 52/717 |
| 3,837,984 | 9/1974 | Wagner et al. | 428/349 |
| 3,856,194 | 12/1974 | Helm | 293/1 |
| 3,894,763 | 7/1975 | Barenyi | 293/1 |
| 4,010,297 | 3/1977 | Wenrick | 428/31 |
| 4,066,285 | 1/1978 | Hall et al. | 293/1 |
| 4,083,592 | 4/1978 | Rubin | 428/31 |
| 4,220,365 | 9/1980 | Foster et al. | 293/128 |
| 4,235,466 | 11/1980 | Mandrik | 293/128 |
| 4,246,303 | 1/1981 | Townsend | 428/31 |
| 4,318,764 | 3/1982 | VanManen | 156/244.11 |
| 4,358,482 | 11/1982 | Jubelt | 427/259 |
| 4,619,847 | 10/1986 | Jackson | 428/31 |
| 4,709,525 | 12/1987 | Adell | 293/128 |
| 4,786,094 | 11/1988 | Barton | 293/128 |
| 4,796,935 | 1/1989 | Maria | 293/128 |
| 4,800,699 | 1/1989 | Lang | 52/717.1 |
| 4,810,015 | 3/1989 | McNeil | 293/128 |
| 4,911,959 | 3/1990 | Miyakawa | 428/31 |
| 5,085,902 | 2/1992 | Yada et al. | 428/31 |

FOREIGN PATENT DOCUMENTS

| | | | |
|---|---|---|---|
| 1512171 | 3/1983 | France . | |
| 2136108 | 2/1973 | Germany . | |
| 8535168 | 11/1987 | Germany . | |
| 2012860 | 8/1979 | United Kingdom . | |
| 2200870 | 8/1988 | United Kingdom | 428/31 |

OTHER PUBLICATIONS

Research Disclosure Jan. 1990, New York, pp. 45–46, XP99333, 'Extended Body Side Molding And Clip Assembly And Method Of Manufacturing The Same'.
Patent Abstracts of Japan vol. 9, No. 34 (M–357) (1757) 14 Feb. 1985 & JP, A, 59 176 144 (Inoue Emu Tee PII K.K.) 5 Oct. 1984, see abstract.

*Primary Examiner*—Nasser Ahmad
*Attorney, Agent, or Firm*—John C. Hunt; Brian W. Gray

[57] ABSTRACT

A body side molding for automobiles. The molding has a rigid base and a cover which is relatively flexible with respect to the base. Covers of disclosed embodiments are of polyvinyl chloride. The base and cover snap together, the cover having retainers on its reverse face, and the base having retainers for engaging the retainers of the cover on its obverse face. The reverse face of the base is secured to a vehicle using double-sided adhesive tape.

23 Claims, 9 Drawing Sheets

5,536,540

AUTOMOTIVE TRIM PIECE

This application is a continuation of application Ser. No. 731,669, filed Jul. 17, 1991, now abandoned.

FIELD OF THE INVENTION

This invention relates to automotive trim pieces such as body side moldings and methods of manufacture therefor. In particular, this invention relates to a trim piece comprising a relatively rigid underlying base for attachment to a vehicle and a relatively flexible cover, which base and cover are adapted to be snapped together by hand.

BACKGROUND OF THE INVENTION

Automotive trim parts, particularly body side moldings of various sorts have been known for many years. Such trim parts have both decorative and protective functions. Typically, there are at least three pieces horizontally aligned and attached on the side of a vehicle: a piece for the front fender; a piece for each door; and a piece for the rear fender.

One known type of molding is made of a polymer coextruded onto a metal carrier strip. The metal is typically aluminum, stainless steel or bimetal and a portion of the metal may be left exposed to enhance the appearance of the molding. The underlying metal carrier generally has an outwardly convex cross-section and its longitudinal edges are bent inwardly to form lips running the length of the piece. This arrangement thus yields a hollow molding which is generally fastened to a vehicle by clipping of the lips to the vehicle body. This type of hollow molding requires a member to be fastened at each of its ends. Such end members close off the hollow ends, precluding each end from undesirably snagging other objects and further enhancing the appearance of the molding by concealing section components. The end members are generally of polymer material and are often differently shaped from each other. For example, the design of certain automobiles requires the front end of a front door molding to be tapered so that it does not catch on the rear edge the of front fender when the door is opened. The rear end of a rear fender molding is often shaped to match the shape of the rear wheel well. In any case, this arrangement results in a trim piece made up of the extruded strip and end members, which must be assembled and fastened to each other during manufacture, and having aesthetically undesirable parting lines between the strip and end members. Its hollow construction is considered advantageous however, for its economical use of materials and light-weight aspect.

Another known type of molding comprises a extruded piece of solid plastic, possibly having a decorative metal strip coextruded as part of its exterior face. The molding is usually fastened to an automobile using an adhesive such as double-sided sticky tape. The extruded strip may be cut to obtain a blunt end during manufacture, but if section components are to be concealed, end members are required as with the hollow-type molding described above. Further, if a piece with shaped ends is desired, end members must generally be used because cutting of the extruded plastic to obtain, for example, a tapered shape results in a cut plastic surface exposed as part of the decorative face of the molding, and this is generally unacceptable in the automotive industry.

A trim piece of hollow construction, not requiring end members to be attached to its ends and which may be readily attached to a vehicle without the use of clips would be considered an improvement over these known types of moldings.

BRIEF SUMMARY OF THE INVENTION

The present invention provides an automotive trim piece having a relatively rigid base for attachment to a vehicle and a relatively flexible decorative cover. The cover and base have means for snap connection to each other and the ends of the cover extend over the ends of the base to conceal the base when the piece is actually attached to a vehicle.

The cover is flexible with respect to the base and its snap connection means is generally manufactured as an integral part of its reverse face. The base has snap connection means on its side for coupling to the reverse face. The snap connection means of the base is integrally manufactured as part of the coupling face of the base but is not necessarily of the same material as the base support.

The preferred snap connection means of the base provides a retainer having a wall facing the coupling face of the base such that a cleft of some sort is defined as part of the base. The preferred snap connection means of the cover provides a retainer having a tab or the like which, when the base and cover are assembled, is received within the cleft such that the cover and base are held together. The preferred retainer of the base also presents a cam surface so that upon pressed engagement of the cover with the base, the tab of the cover engages the cam so as to be deflected by it and resiliently flex into the cleft defined as part of the base.

DETAILED DESCRIPTION OF PREFERRED EMBODIMENTS

Figure 1:
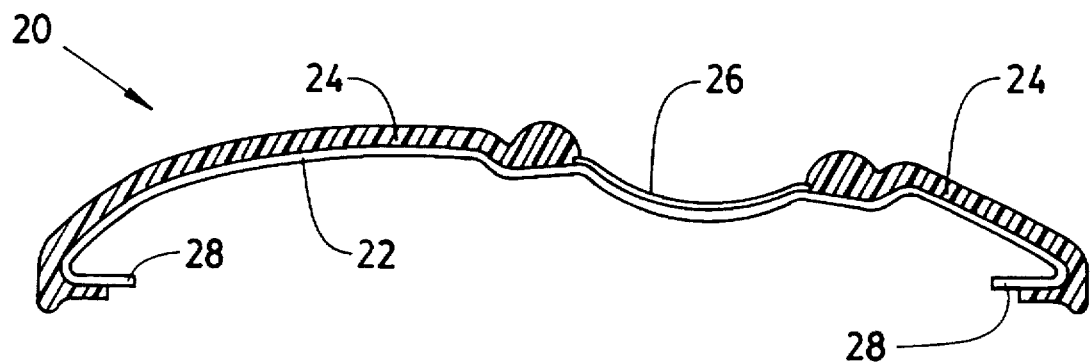
FIG. 1 illustrates, in cross-section, a first prior art trim piece of hollow construction having polymer coextruded onto a metal carrier strip.

A first prior art body side molding 20 having a hollow construction is shown in cross-section in FIG. 1. Molding 20 comprises metal carrier strip 22 with coextruded polymer 24 and decorative metal layer 26 adhesively bonded thereto and having longitudinal lips 28 shown in cross-section. The lips may be used to clip the molding to a car body by known means.

Figure 2:
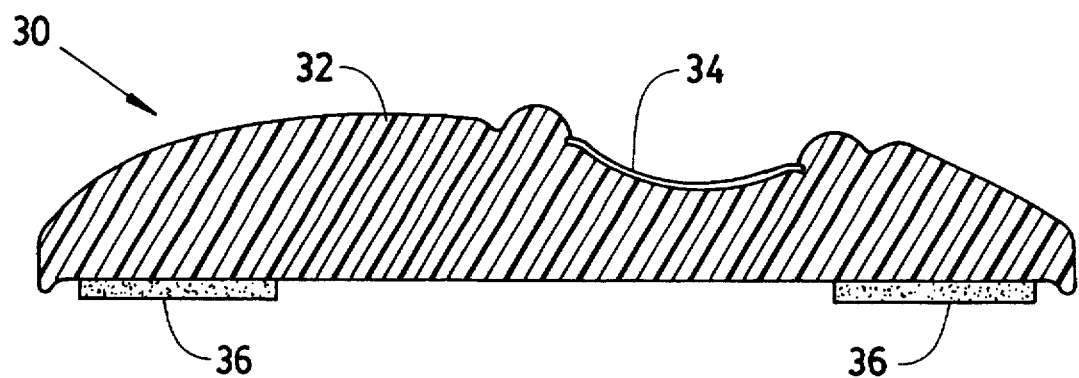
FIG. 2 illustrates, in cross-section, a second prior art trim piece of solid extruded plastic having a decorative metal strip coextruded therewith, for adhesive attachment to a vehicle.

A second prior art body side molding 30 having a solid plastic construction is shown in FIG. 2. Molding 30 comprises solid extruded plastic 32 having decorative metal layer 34 adhesively bonded thereto. Adhesive provided by double-sided adhesive tape 36 provides means for attaching the molding to a car body.

Figure 3:
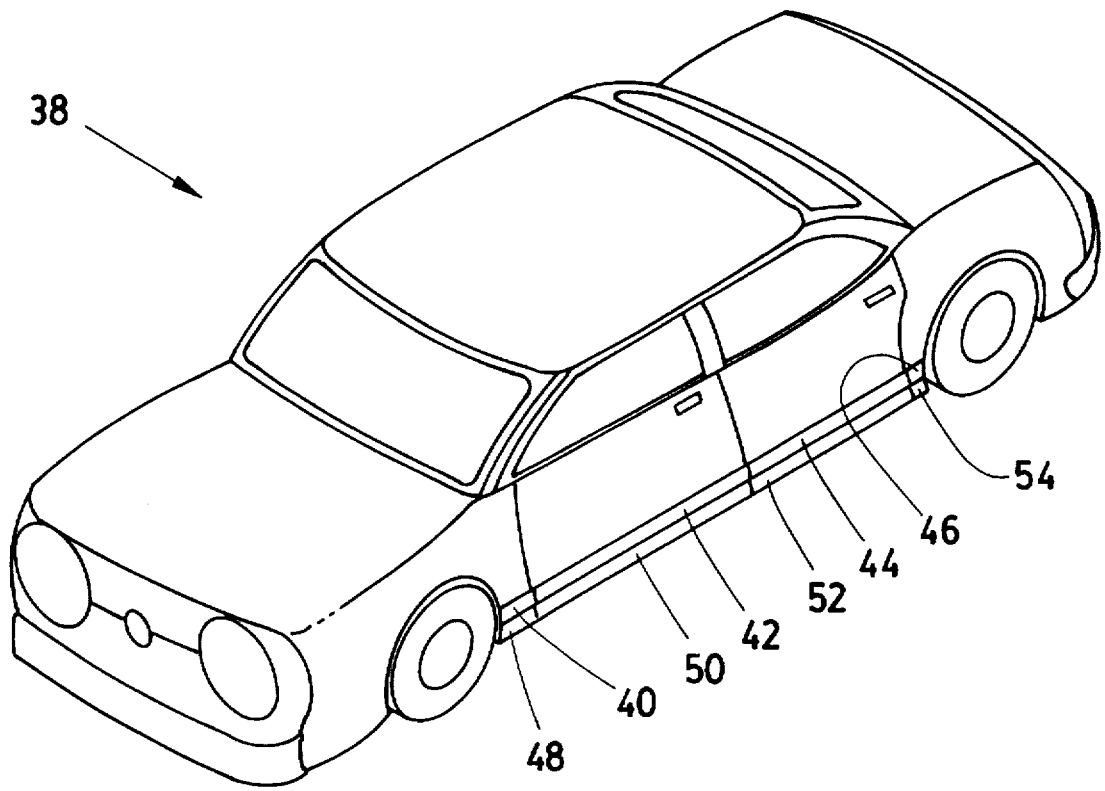
FIG. 3 illustrates a trim piece of the present invention as it would be appear attached to an automobile.
Figure 4:
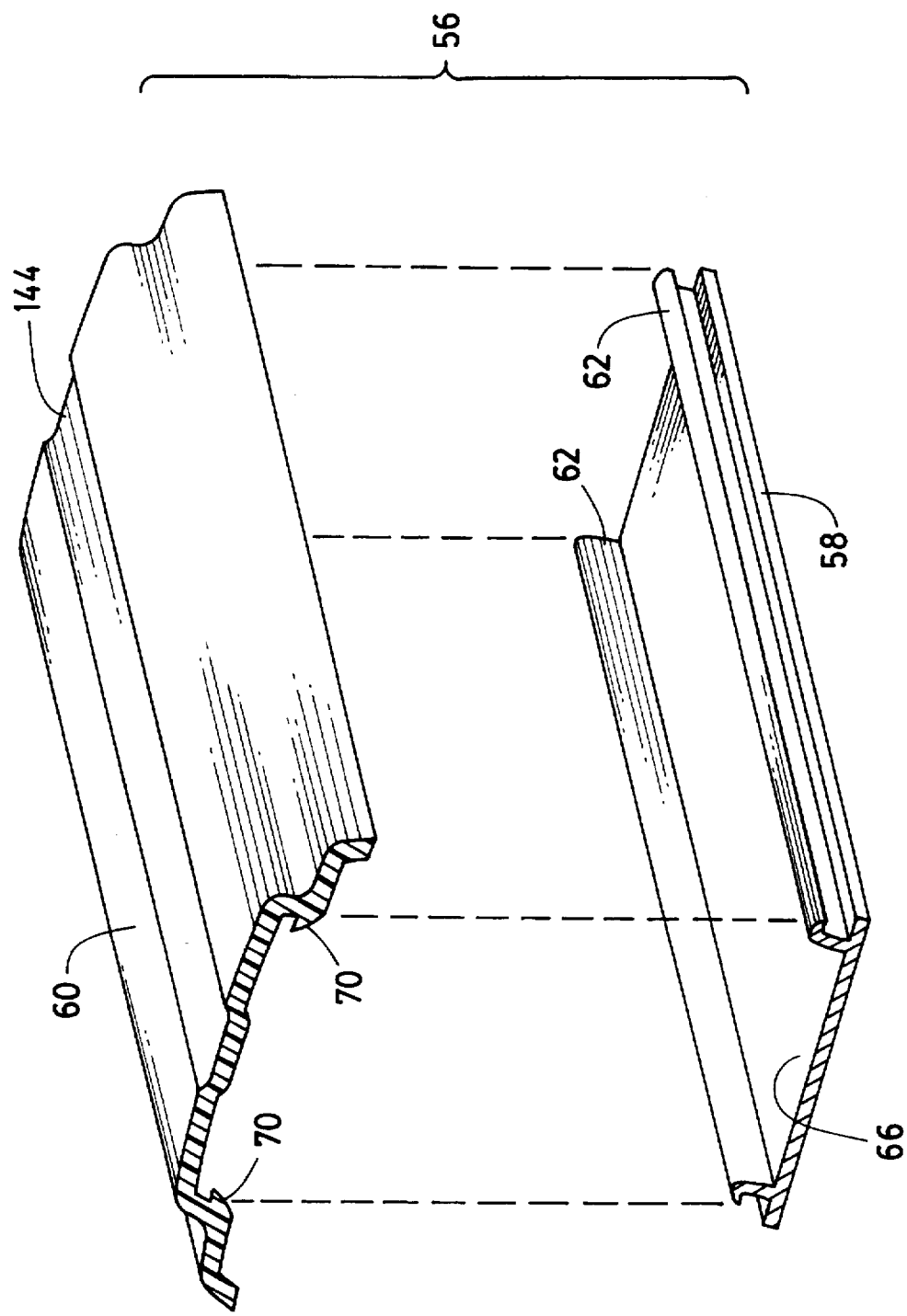
FIG. 4 is an exploded isometric view of a portion of a first embodiment of the present invention.

FIG. 3 illustrates automobile 38 having preferred embodiment trim pieces 40, 42, 44 and 46 of the present invention attached to its front fender 48, front and rear doors 50, 52 and rear fender 54 respectively.

A first preferred embodiment trim piece 56 of the present invention is shown in detail in FIGS. 4–8. The trim piece comprises base 58 and hollow cover 60. The base is rigid with respect to the cover and is thus relatively rigid; the cover is flexible with respect to the base and is thus relatively flexible. Base 58 is provided with a pair of relatively rigid retainers 62. Each retainer provides a wall 64 having a surface oriented towards, that is, which faces the coupling face 66 of the base such that a cleft 68 is defined between the wall and coupling face. The cover is provided with tabs 70 which are received within a cleft when the cover and base are assembled.

Figure 5:
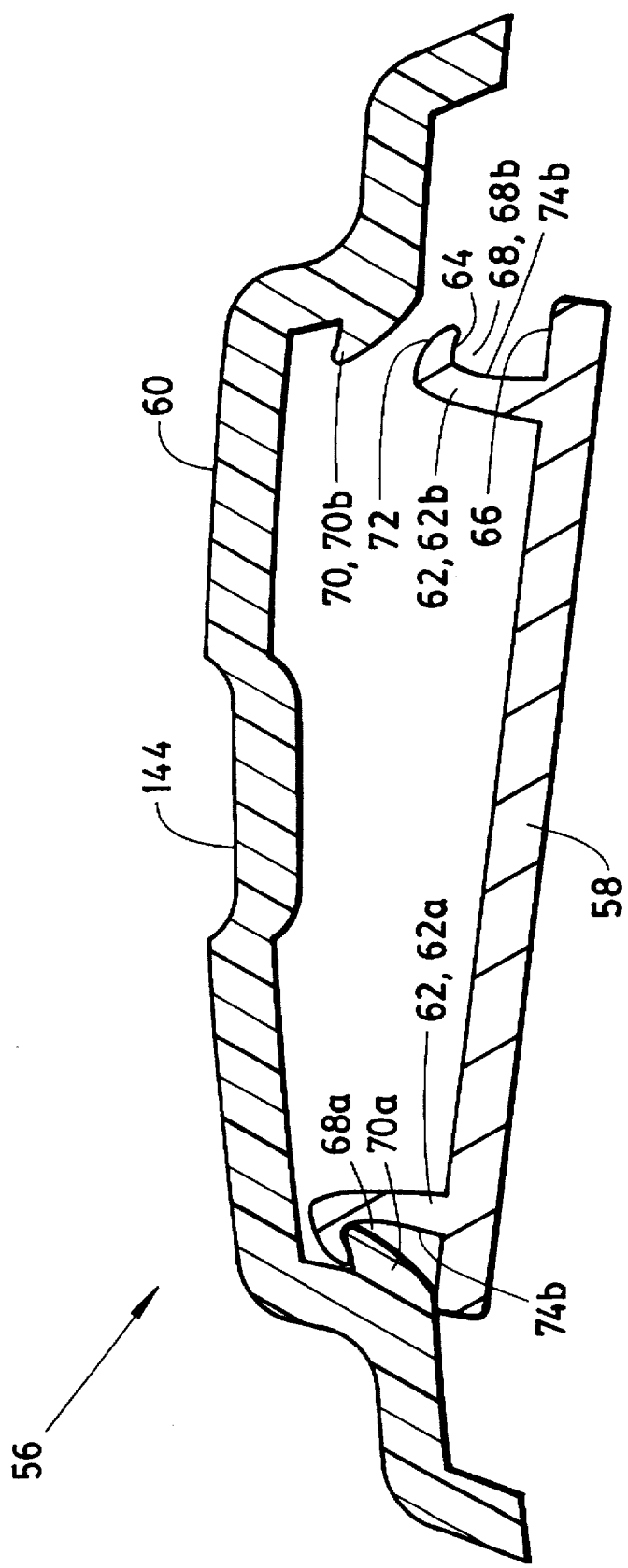
FIG. 5 is a cross-sectional view of the FIG. 4 embodiment, partially assembled.
Figure 6:
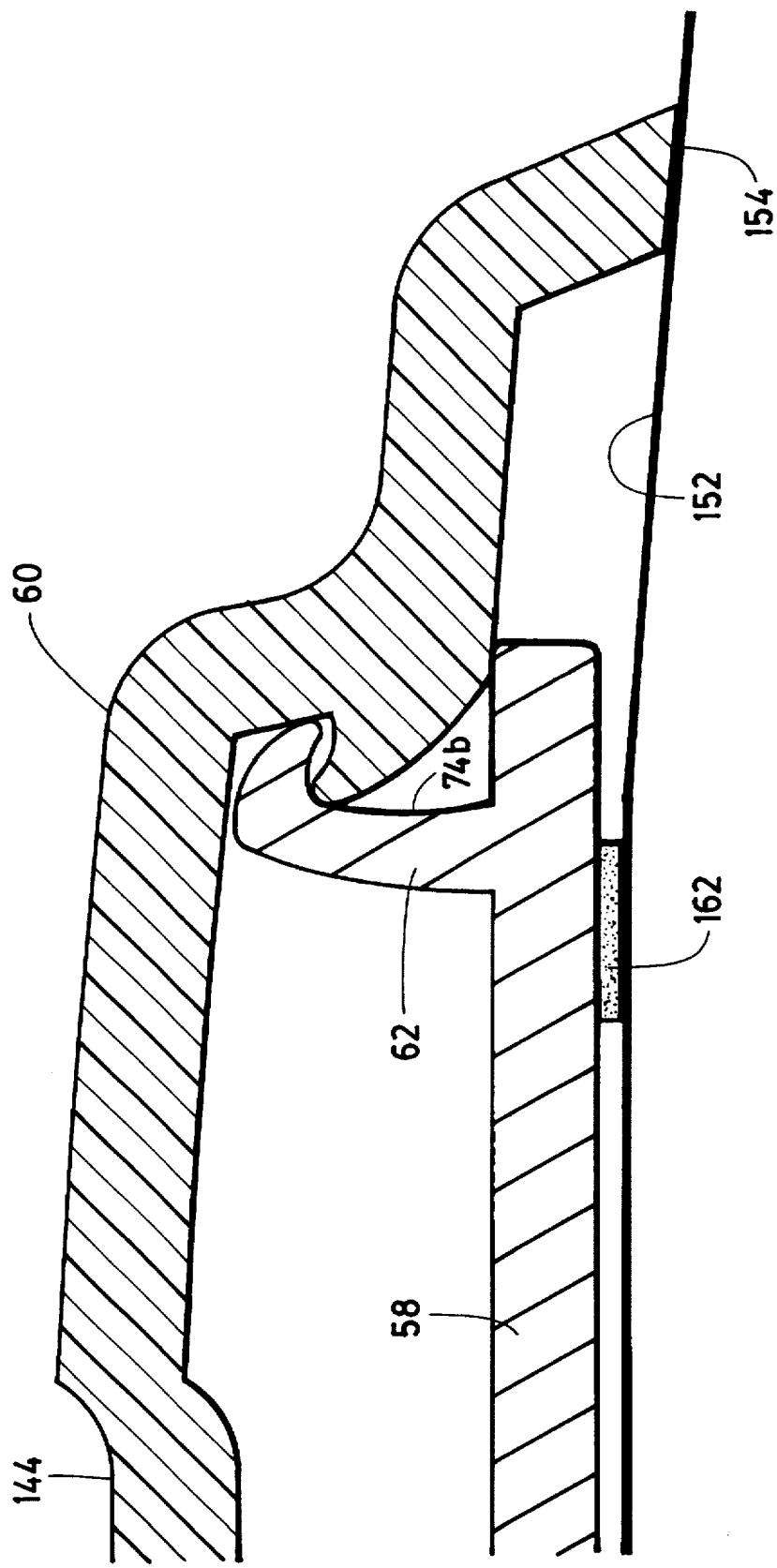
FIG. 6 is a cross-sectional view of the FIG. 4 embodiment, assembled, taken along 6—6 of FIG. 4.

Base 58 and cover 60 may be conveniently snapped together for hand assembly by slipping tab 70a within cleft 68a as seen in FIG. 5 whereupon tab 70b is brought into engagement with cam surface 72 of retainer 62b as the base and cover are pressed together. As the base and cover are further pressed together the relatively flexible tab 70b is deflected by cam surface 72 and once it is pressed sufficiently towards the base, it resiliently deflects or snaps into cleft 68b. Clefts of the base retainers 62a, 62b are oppositely oriented and oppositely facing walls 74a, 74b in abutting tabs 70a, 70b thus cooperate to hold cover 60 against side-to-side movement with respect to the base to hold the tabs in abutment against walls 64 which abutment precludes pulling apart of the base and cover. During assembly, abutment of cover and base surfaces such as tab 70a and wall 74a also hold the cover and base against side-to-side movement so that as the base and cover are pressed together a camming action is achieved as tab 70b engages cam surface 72 and tab 70b resiliently flexes back towards its unstressed position in cleft 68b. It will appreciated that there are many arrangements of abutting surfaces by which such a snap connection may be achieved.

Base 58 is cut to an appropriate length so that abutment of its ends 76 with dams 78 precludes substantial lengthwise movement of the cover and base with respect to each other, but at the same time permits the cover to float on the base slightly when the piece is exposed to temperature variations, given different thermal expansion coefficients of base and cover material. Only one dam 78 is shown in FIG. 7, but there would be a corresponding dam at the other end of the cover.

Figure 7:
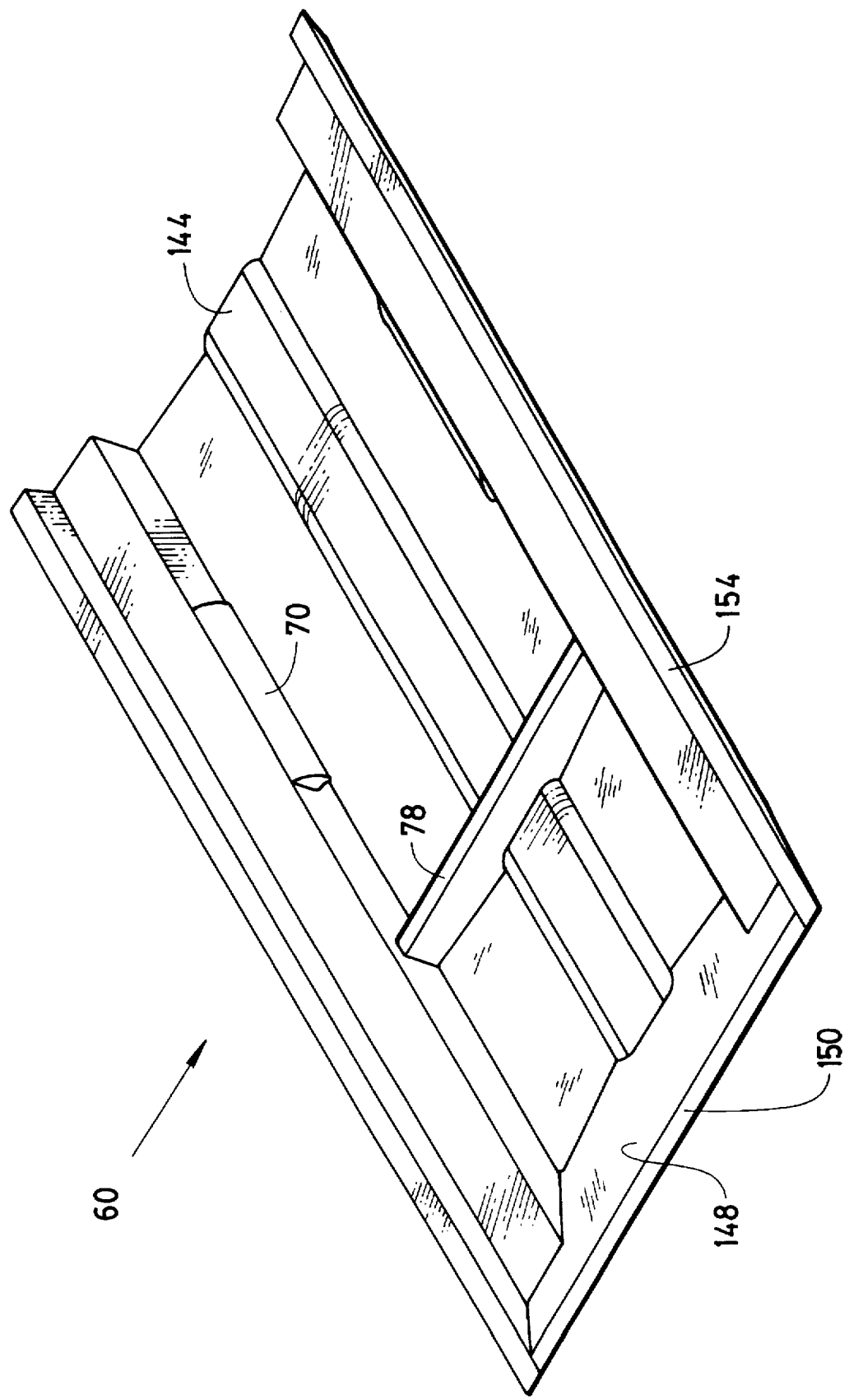
FIG. 7 is an isometric end view of the reverse face the cover the FIG. 4 embodiment.
Figure 8:
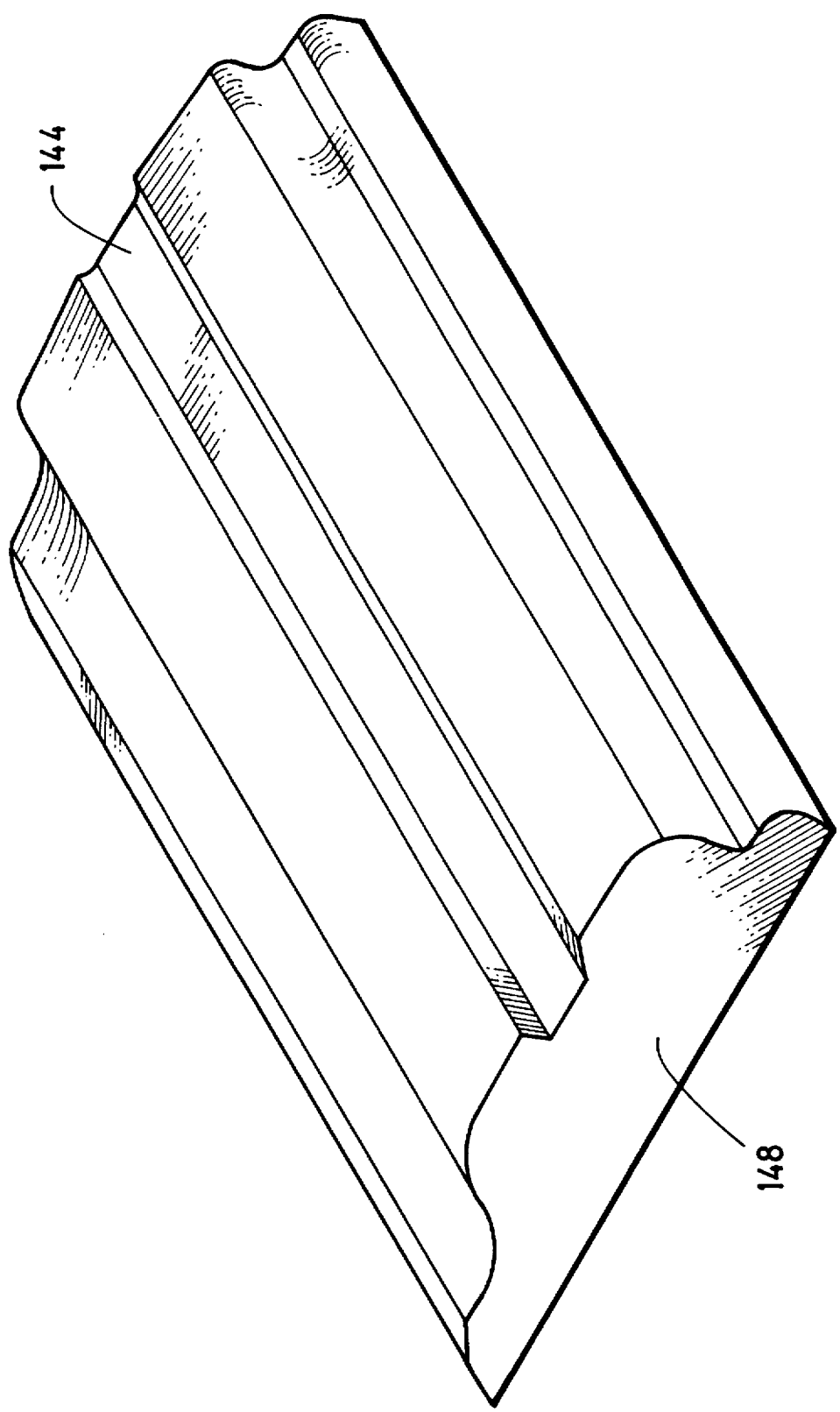
FIG. 8 is an isometric end view of the obverse face the cover of the FIG. 4 embodiment.
Figure 9:
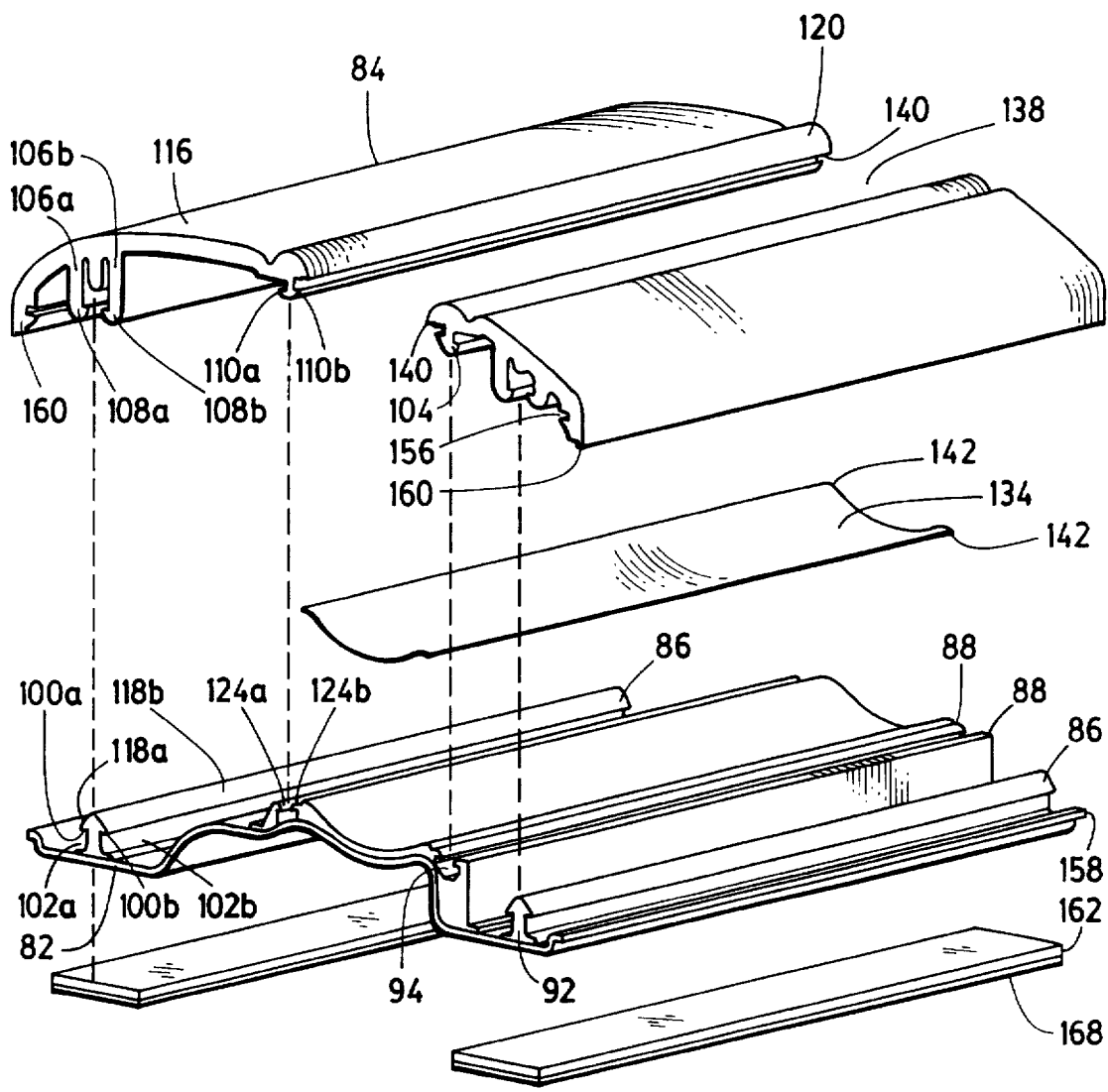
FIG. 9 is an exploded isometric view of a portion of a second embodiment of the present invention.
Figure 10:
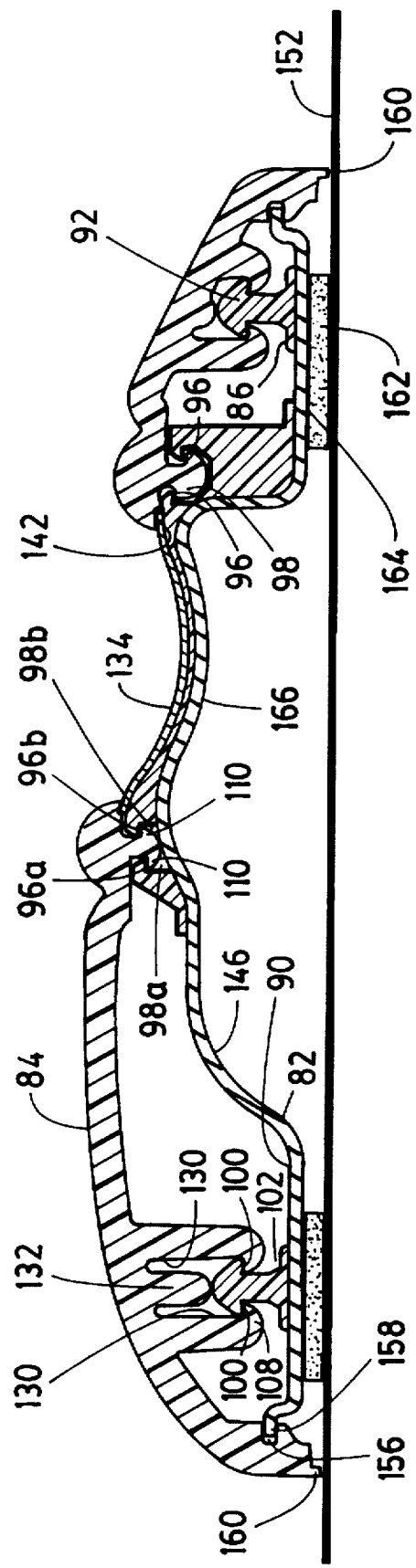
FIG. 10 is a cross-sectional view of the FIG. 9 embodiment, assembled, taken along 10—10 of FIG. 9.

Tabs 70 are located on either side of the center of cover 60 as seen in FIG. 7. Preferably the tabs are each an inch or two long with a few inches between them, running from end to end of the cover between dams 78. A second preferred embodiment trim piece 80 is shown in FIGS. 9 and 10. This trim piece comprises base 82 and hollow cover 84. Base 82 has relatively rigid retainers 86, 88 on its coupling face 90. Retainers 86 have a cross-section in the shape of a barbed arrowhead 92 while a trough 94 is defined between each pair of retainers 88, each retainer 88 defining a wall 96 facing, that is, oriented towards the coupling face 90 of the base such that a cleft 98 is defined therebetween. Each retainer 86 has walls 100 facing coupling face 90 to define clefts 102 between each wall and the coupling face. Cover 84 has integrally molded as a part thereof cover retainers 104, 106, which retainers each provide tabs 108, 110 for receipt within a corresponding cleft 102, 98 as best seen in FIG. 10 when the cover and base are assembled.

Base 82 and cover 84 may be conveniently snapped together by pressing them together by hand. For example, aligning the cover and base as shown in FIG. 9 and then pressing the cover in region 116 will force tabs 108a, 108b to be deflected by cam surfaces 118a, 118b and when pressed past walls 100a, 100b the tabs will resiliently flex back into clefts 102a, 102b. Similarly, pressing the cover in region 120 against the base will force tabs 110a, 110b to be deflected by cam surfaces 124a, 124b and when pressed past walls 96a, 96b the tabs resiliently flex back into clefts 98a, 98b.

It can be seen that the interlocking retainers of base 82 and cover 84 are stabilized against relative movement when assembled. A snug fit of each arrowhead 92 into the channel defined between tabs 108 of each retainer 106 is provided by abutment of the arrowhead against cover retainer surfaces 130 and the head of ridge 132 located in the channel. Similarly, surfaces of interlocking retainers 104 of the cover and retainers 88 of the base abut to provide a snug fit of the retainers when the base and cover are assembled.

Base 58 is manufactured as a single piece of extruded fiber-reinforced polyurethane cut to an appropriate length for the cover with which it is to be used. The base may be made of alternative relatively rigid materials including injection-molded material, attention being had to, for example, the variations in weather conditions to which the piece may be exposed when choosing alternatives.

Base 82 is preferably manufactured by rollforming an aluminum support strip to the cross-section shown in FIG. 10 followed by extrusion onto the strip with adhesive bonding thereto of relatively rigid PVC (polyvinyl chloride) in the cross-section of retainers 86, 88, but again, these are only the preferred materials and method of manufacture. In particular, the strip may be of aluminum, steel, stainless steel, zinc, galvanized steel or other suitable material. It will be appreciated that stock material having the cross-section of base 82 of the FIG. 9 embodiment may be manufactured and cut to the required length for use with any suitably matched cover for a front or rear door or fender.

Base 82 also has decorative metal strip 134 adhesively bonded to underlying PVC. Strip 134 is visible through window 138 defined by edges 140 of cover 84 which overlie perimeter portions 142 of the strip in the assembled piece. The overlying edges thus protect against a peeling away of metal strip 134 from the underlying PVC.

Base 82, being of extruded material is of relatively constant cross-section from end to end, although its ends may have a tapered, rather than a blunt cut to match the reverse or underside of a cover also having tapered end with which it is intended to be assembled.

Covers 60, 84 may be made of any suitable relatively flexible polymer or plastic with attention being had to the variations in weather conditions to which the piece may be exposed and other physical requirements of an automotive trim piece. Injection-molded PVC having a hardness rating of 90 Shore A has been found to be suitable.

Covers 60, 84 are considered "3hollow" in the context of this invention in that each has as a part of its reverse side a portion into which projects a part of the base, ie. a base retainer. Clearly more advantage in economical use of materials is obtained as less polymer or plastic is used as part of the cover. Central depression 144 is molded as part of cover 60, thus strengthening the hollowed out portion of the cover against bending and lending a visual effect. Shaping of a longitudinal base such as that of base 82 to have a central raised portion 146 running from end to end provides for reinforcement of the relatively flexible cover 84 while providing for a cover of substantially hollowed out cross-section, i.e., forming a hollow cavity.

Covers of the present invention have as an integrally manufactured part thereof, end portions, exemplified by tapered end portion 148 of cover 60. An end portion may be of any desired shape that serves to cover the base to which the cover is connected. Preferably, to cover the end of base 58, the end edge 150 of cover 60 is shaped to be flush with vehicle body surface 152 when trim piece 56 is attached to a vehicle. That is, as in FIG. 6, where longitudinal edges 154 of cover 60 meet with the vehicle body surface to cover the underlying base, so do end edges 150. A cover could be dimensioned such that its edges are shaped to conceal a base without its edges actually meeting the vehicle body surface, but such an arrangement would usually be considered to be disadvantageous if it provides means by which an installed trim piece could be wedged away from the auto body.

Second embodiment cover 84 has additional grooves 156 for receipt of raised longitudinal edges 158 of base 82 for additionally stabilizing longitudinal edges 160 of cover 84 against body surface 152.

The illustrated trim pieces of this invention are fastened to a body surface by means of an adhesive provided by double-sided adhesive tape 162, preferably acrylic foam tape, attached to surface 164 of bases 58, 82. Base 82, while providing an outwardly convex hollow central portion 166 provides longitudinal areas for attachment of adhesive tape, which areas generally match the contour of the vehicle body to which the piece is to be attached, such as surface 152. Generally speaking one side of the tape would be fastened to the base at its site of manufacture and a release layer 168 on the remaining outwardly facing side of each tape would be left in place, to be removed just prior to attachment of an assembled piece to a vehicle.

There are many variations on the snap connection provided by the tabs and retainers of the illustrated embodiments within the scope of the present invention. The snap connection is provided during assembly by a deflection of a portion, ie. tab, of the relatively flexible cover as it is pressed against a portion, ie. retainer, of the relatively rigid base such that the tab will ultimately resiliently flex into a cleft in which it is retained so as to hold the base and cover together.

What is claimed is:

1. An automotive trim piece comprising:

(a) a relatively rigid base for attachment to a vehicle;

(b) a relatively flexible decorative hollow cover;

(c) means on the base and cover for snap connection of the cover to the base; and wherein:

(d) ends of the cover are formed in a shape to extend over the ends of the base to conceal the base such that the cover and said ends form a seamless automotive trim pieces covering.

2. The trim piece of claim 1 wherein at least one of the ends is tapered.

3. The trim piece of claim 1 wherein:

the means for snap connection on the base comprise a relatively rigid retainer on a first face for coupling to the cover, which retainer has a wall having a surface oriented towards the first face to define a cleft between the wall and the first face; and the means for snap connection on the cover comprise at least one tab on a reverse face of the cover for receipt within the cleft when the cover and base are coupled, which tab is integrally molded as part of the cover.

4. The trim piece of claim 3 wherein the means on the base further comprise a cam surface located on the retainer so that upon pressed engagement of the cover with the base, the tab engages the cam so as to be deflected thereby and resiliently flexes into the cleft to secure the coupled base and cover together.

5. The trim piece of claim 4 wherein there are two said retainers on the first face of the base, one retainer is on each side of a center line of the base and the clefts defined thereby are oppositely oriented to hold the cover against side-to-side movement with respect to the base when the piece is assembled.

6. The trim piece of claim 1 wherein:

the means on the base comprise a relatively rigid retainer on a first face of the base, which retainer has the cross-section of an arrowhead having two barbs and each barb has a wall facing the first face of the base to define a cleft between the barb and the first face; and the means on the cover comprise a retainer which defines a pair of tabs on a reverse face of the cover, each of which is received within one of the clefts so as to be paired therewith when the cover and base are assembled, to hold the base and cover together in an assembled piece.

7. The trim piece of claim 6 wherein the means on the cover further comprise a pair of surfaces located on the retainer so that upon pressed engagement of the cover and base for assembly, each surface engages a surface of the retainer on the base such that each tab is cammingly deflected and resiliently flexes to be received within its paired cleft.

8. The trim piece of claim 1 wherein:

the means on the base comprise a pair of retainers which define a channel on a first face of the base, each retainer having a wall facing the first face to provide a cleft between the wall and the first face;

the means on the cover comprise a retainer having a pair of tabs on a reverse face of the cover which retainer is received within the channel when the base and cover are assembled such that each of said tabs abuts a wall of one of the retainers on the base so as to be paired with the wall to secure the base and cover together; and for assembly of the cover and base, the retainer on the cover may be pressed by hand into the channel such that each tab is cammingly deflected by a surface on the retainer on the base and resiliently flexed into position to abut its paired wall.

9. The trim piece of claim 1 wherein the base comprises fiber-reinforced polyurethane.

10. The trim piece of claim 1 wherein the cover comprises polyvinyl chloride.

11. The trim piece of claim 1 wherein the cover has a dam at each of its ends on a reverse face thereof located to abut respective ends of the base to preclude substantial lengthwise movement of the cover with respect to the base when the piece is assembled.

12. The trim piece of claim 1 wherein the base comprises a metal.

13. The trim piece of claim 12 wherein the metal is selected from the group consisting of aluminum, steel, stainless steel, zinc and galvanized steel.

14. The trim piece of claim 1 wherein the base comprises a strip of rollformed aluminum.

15. The trim piece of claim 14 wherein the base further comprises relatively rigid plastic extruded onto and adhesively bonded to the aluminum strip.

16. The trim piece of claim 15 wherein the base further comprises a decorative metal strip adhesively bonded to polyvinyl chloride extruded onto and adhesively bonded to the aluminum strip and the cover defines a window through which the decorative metal strip is visible when the piece is assembled.

17. The trim piece of claim 16 wherein edges of the cover defining the window of the cover overlie perimeter portions of the decorative metal strip when the piece is assembled.

18. The trim piece of claim 14 wherein the aluminum strip is shaped to provide raised longitudinal edges and the cover defines grooves for receipt of the longitudinal edges when the cover and base are assembled.

19. The trim piece of claim 1 wherein double-sided adhesive tape is provided on a second face of the base for attachment to an automobile.

20. The trim piece of claim 7 wherein the retainer of the cover further provides a channel between the tabs, which channel is shaped to define surfaces which abut surfaces of the retainer of the base to provide a snug fit of the retainers when the cover and base are assembled.

21. The trim piece of claim 1 wherein the base is longitudinal and has a central raised portion running from end to end.

22. The trim piece of claim 1 wherein the base is longitudinal and of relatively constant cross-section from end to end.

23. The trim piece of claim 1 wherein the cover is of injection-molded plastic.

* * * * *